E. H. ANGELL.
Tether.
No. 226,014.  Patented Mar. 30, 1880.
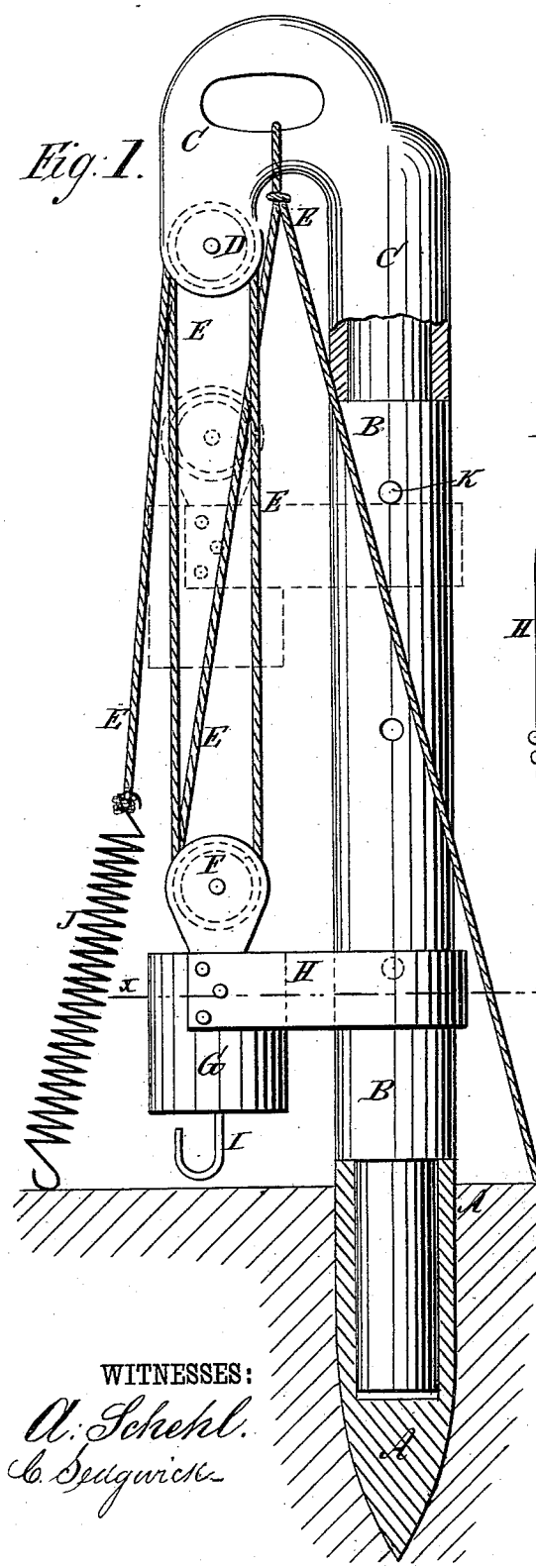
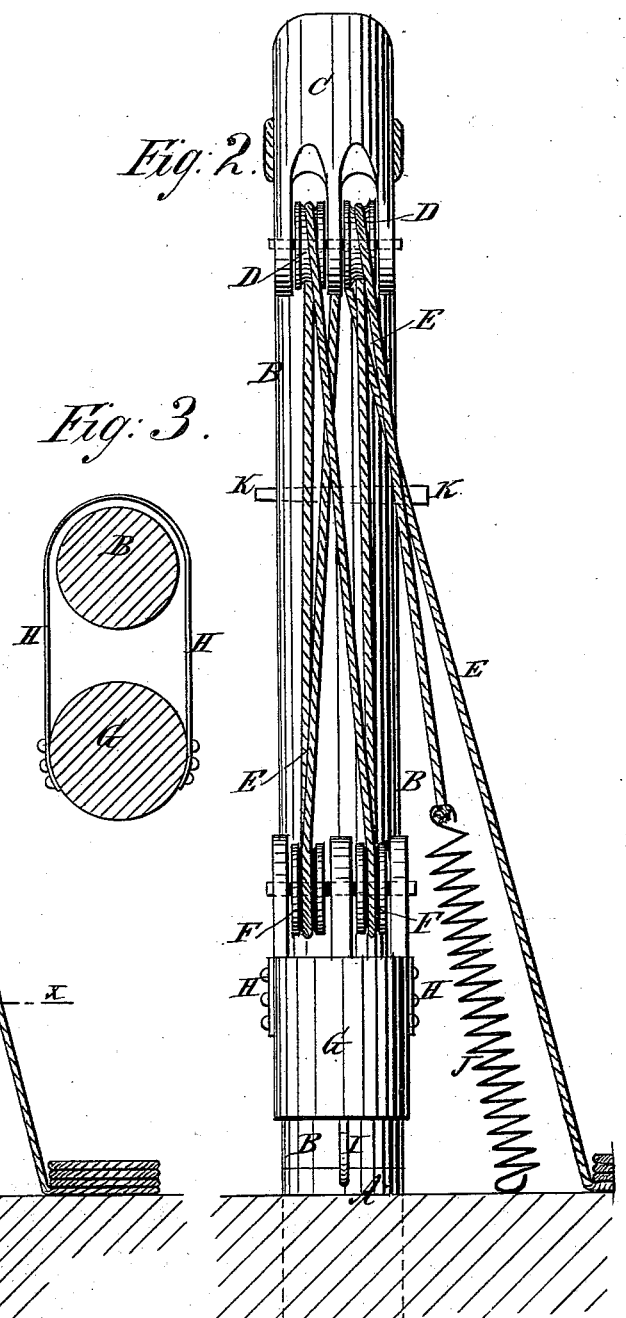
WITNESSES:
A. Schehl.
C. Sedgwick.
INVENTOR:
E. H. Angell
BY Munn & Co
ATTORNEYS.

UNITED STATES PATENT OFFICE.

EUGENE H. ANGELL, OF MOOERS, NEW YORK.

TETHER.

SPECIFICATION forming part of Letters Patent No. 226,014, dated March 30, 1880.

Application filed February 10, 1880.

*To all whom it may concern:*

Be it known that I, EUGENE H. ANGELL, of Mooers, in the county of Clinton and State of New York, have invented a new and useful Improvement in Combined Tethers and Tackles, of which the following is a specification.

Figure 1 is a side elevation, partly in section, of the improvement. Fig. 2 is a front elevation. Fig. 3 is a sectional plan view taken through the line $x\ x$, Fig. 1.

The object of this invention is to furnish combined tethers and tackles, so constructed that when arranged as a tether the slack of the rope will be taken up to prevent the animal from becoming entangled in it, which will prevent the tethered animals from being injured by a sudden pull or jerk upon the rope, and which will allow the tackle to be detached from the tether and used as an ordinary tackle.

The invention consists in constructing a combined tether and tackle of a supporting-foot, post, and head, a tackle, a U-strap to keep the weight close to the post as its moves up and down, and a spiral spring to prevent the animal from being injured by a sudden jerk, as will be hereinafter fully described.

Similar letters of reference indicate corresponding parts.

A represents a hollow pointed metallic foot, which is driven into the ground to give a firm support to the tether. B is a post of convenient length, and of such a size as will give it the requisite strength. The post B may be made of wood or iron, and upon its lower end is formed a round tenon, which fits into the cavity of the foot A and swivels the said post to the said foot.

If desired, the post B and foot A may be made in one piece.

Upon the upper end of the post B is formed a round tenon, which fits into the socket in the head C.

The head C may turn upon the post B, or head and post may turn together, as may be desired.

The head C projects upon one side, and in the said projecting part are formed slots, in which are pivoted one, two, or more pulleys, D. Around the pulleys D passes a rope, E, which also passes around one, two, or more pulleys, F.

The pulleys F are pivoted to a weight, G, to the opposite sides of which are attached the ends of a U-strap, H, which passes around and turns upon the post B, to keep the weight G close to the side of the said post B. To the lower side of the weight G is attached a hook, I, for use when the tackle is used for hoisting purposes.

One end of the rope E is attached to the head C, a slot or aperture being formed in the said head for convenience in securing the rope and for use in suspending the head when the tackle is to be used for hoisting purposes. To the other end of the rope E is attached the end of a spiral spring, J, to the other end of which the animal is attached.

The spring J prevents the animal from being injured by the jerk should he extend the rope to its full length in running or jumping.

With this construction, as the animal draws upon the rope E the strap H slides up the post B, and as he approaches the post the weight G descends, the said weight G keeping the rope E always taut, so that the animal cannot become entangled in it.

The height to which the weight G rises, and consequently the diameter of the circle within which the animal can graze, is limited by a cross-pin, K, inserted in a hole in the post B, and against which the strap H strikes as the weight G is raised. Several holes are formed in the post B to receive the pin K, so that the size of the grazing-space may be regulated as required.

Having thus fully described my invention, I claim as new, and desire to secure by Letters Patent—

1. A combined tether and tackle, constructed substantially as herein shown and described, consisting of the point A, the post B, the head C, the tackle D E F G, the U-strap H, and the spiral spring J, as set forth.

2. In a combined tether and tackle, the combination, with the post B and the strap H, of the cross-pin K, substantially as herein shown and described, to limit the upward movement of the weight G, as set forth.

EUGENE H. ANGELL.

Witnesses:
GEORGE H. HALL,
E. P. SOUTHWICK.